United States Patent Office 3,767,688
Patented Oct. 23, 1973

3,767,688
COMPLEX COBALT CARBONYL COMPOUNDS
Charles E. Morrell, Summit, and Lubomyr B. Taranko, Scotch Plains, N.J., assignors to Esso Research and Engineering Company
No Drawing. Filed Dec. 15, 1971, Ser. No. 208,403
Int. Cl. C07f 15/06
U.S. Cl. 260—439 R    10 Claims

ABSTRACT OF THE DISCLOSURE

Novel compositions of matter as complex cobalt carbonyl compounds are prepared by contacting trivalent halide salts of Group V metals with alkali or alkaline earth metal cobalt carbonyl compounds under moderate temperature and pressure conditions and in the presence of a solvent and the substantial absence of oxygen. The invention also includes the reaction of the cobalt carbonyl compounds with biphyllic ligand materials to form complex cobalt carbonyl ligand compositions. These novel compositions of matter are useful as catalysts for the reaction of carbon monoxide together with other co-reacting substrates containing a wide range of organic molecules such as olefins, di- and polyolefins, aromatics, alcohols, amines, alkyl and aryl halides, olefin oxides, nitriles, etc.

BACKGROUND OF THE INVENTION

This invention relates to the formation of novel cobalt carbonyl compositions of matter by the reaction of trivalent halide salts of Group V metals or metalloids with alkali or alkaline earth cobalt tetracarbonyls under moderate reaction and temperature conditions and in the substantial absence of oxygen. More preferably, the preparation is carried out by the reaction of the Group V metal or metalloid halide with dicobalt octacarbonyl in the presence of a suitable solvent and under a nonoxidizing atmosphere, preferably one rich in carbon monoxide. More particularly, the invention describes a method for preparing compositions of matter having the general formula $MCo_3(CO)_Y$, wherein M is a Group V metal or metalloid and Y is an integer ranging from 9–12 inclusive. Additionally, the invention relates to a method for forming compositions of matter having the general formula $MCo_3L_H(CO)_I$ where M is a Group V metal or metalloid, including the elements phosphorus, arsenic, antimony, bismuth, vanadium, niobium and tantalum; L is a ligand, preferably of the $\pi$-acid type including phosphines, arsines and stibines, H is an integer ranging from 1–3 inclusive, I is an integer ranging from 6–11 inclusive and the sum of $H+I$ is an integer ranging from 9–12 inclusive.

DESCRIPTION OF THE PRIOR ART

Methods for making various organometallic compositions of matter are well known in the art. For example, U.S. 3,496,203 describes a process for the formation of tertiary organophosphine cobalt carbonyl complexes, while U.S. 3,452,070 discusses a method for making bridged dinuclear Group VIII metal carbonyls. The formation of bistriphenyl phosphine nickel trichloroethylene is described in detail in U.S. 3,395,165; tetrakis organophosphorus nickel compounds are prepared by a method as described in U.S. 3,328,443. Finally, complexes of organophosphorus fluorides with zero-valent transition metals are described in U.S. 3,242,171. However, none of the prior art processes have described a method for forming the novel compositions as illustrated by the general formulas $MCo_3(CO)_Y$ and $MCo_3L_H(CO)_I$. Hence the art is in need of an effective method of preparing these novel compositions which are useful as catalysts in various carbonylation reactions.

SUMMARY OF THE INVENTION

In accordance with the present invention novel compositions of matter represented by the general formulas: $MCo_3(CO)_Y$ and $MCo_3L_H(CO)_I$ as a new class of organometallic compounds may be prepared by contacting a compounds (A) of the formula $MX_3$ with a compound (B) of the formula $ZCo(CO)_4$, where Z represents one atom weight of an alkali metal such as lithium, sodium or potassium, or ½ atom weight of an alkaline earth metal such as calcium, magnesium, strontium or barium. Compound A is representative of trivalent halides of Group V metals while compound B is illustrative of alkali or alkaline earth metal cobalt carbonyls. Typically, the contacting is carried out in polar solvents, preferably ethers, and in the presence of a nonoxidizing atmosphere and at moderate temperature and pressure conditions.

An often preferred procedure for synthesizing compounds of the $MCo_3(CO)_Y$ type is the reaction of the $MX_3$ compound with cobalt octacarbonyl $(CO)_4Co-Co(CO)_4$, again in the presence of suitable solvents, preferably ethers, and in the presence of a nonoxidizing atmosphere, preferably one rich in carbon monoxide.

Compounds of the general formula $MCo_3(CO)_Y$ can be isolated from the reaction products and subsequently converted to ligand-containing compounds of the formula $MCo_3L_H(CO)_I$ by reacting the pure $MCo_3(CO)_Y$ compound with pure ligand L, preferably in a solvent and generally at sufficiently high temperatures. An alternate and often preferred procedure is to react ligand L with the reaction mixture from the $MX_3\text{-}Co_2(CO)_8$ reaction before removal of solvent or cobalt halide products. The compounds $MCo_3L_H(CO)_I$ can be recovered directly from the resulting reaction mixture by removing solvent and cobalt halides. The amount of ligand L in the resulting product is determined by the amount added to the reaction mixture. The compounds represented by the formula $MCo_3L_H(CO)_I$ are generally more stable, when stored in the purified state, than those of formula $MCo_3(CO)_Y$.

The new compositions of matter represented by the general formula $MCo_3(CO)_Y$ may be referred to as metal cobalt carbonyl compounds and have been found to contain three cobalt carbonyl groups per atom of metal present. M of the above formula is generally a Group V metal or metalloid including phosphorus, arsenic, antimony, bismuth, vanadium, niobium and tantalum. Y is an integer ranging from 9 to 12 inclusive. Compounds having the following structures may accordingly be prepared:

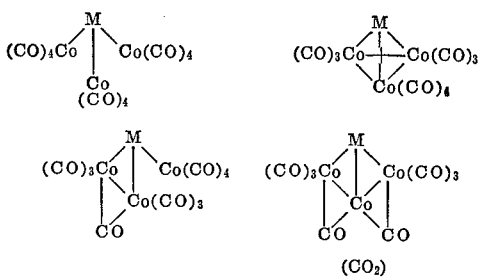

These compounds above may be prepared in a variety of manners, for example, the trivalent halides, i.e., iodides, bromides, chlorides or fluorides of Group V metals or metalloids may be reacted with an alkali metal or a Group II cobalt carbonylate salt prepared from cobalt octacarbonyl by known methods. A typical preparative reaction may be illustrated by the following equation:

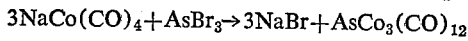

Preferably, however, these compounds are prepared directly from trivalent Group V halides and cobalt octacarbonyl, without the aid of Groups I and II metals, by reacting the materials in polar solvents, preferably ethers, and more preferably THF, and in the presence of a nonoxidizing atmosphere. The use of carbon monoxide is preferred as a nonoxidizing atmosphere since it not only prevents oxidation, but moreover stabilizes both reactants and products against decomposition. Typical of the above preparation are the following reactions:

(a) $PI_3 + 2\frac{1}{4} Co_2(CO)_8 \rightarrow 1\frac{1}{2} CoI_2 + PCo_3(CO)_9 + 9CO$ (b) $AsBr_3 + 2\frac{1}{4} Co_2(CO)_8 \rightarrow 1\frac{1}{2} CoBr_2 + AsCo_3(CO)_9 + 9CO$ (c) $BiI_3 + 2\frac{1}{4} Co_2(CO)_8 \rightarrow 1\frac{1}{2} CoBr_2 + BiCo_3(CO)_{12} + 6CO$ Under preferred synthesis conditions it is also possible to effect the conversion of one type of compound to another. For example, the primary product of the following reactions:

$BiI_3 + 2\frac{1}{4} Co_2(CO)_8 \rightarrow 1\frac{1}{2} CoBr_2 + BiCo_3(CO)_{12} + 6CO$ carried out by mixing the reagents in THF under 1 atmosphere of carbon monoxide at room temperature, can be converted to various intermediate products $BiCo_3(CO)_{11}$ and $BiCo_3(CO)_{10}$ and finally to the compound $BiCo_3(CO)_9$ by heating to temperatures up to the boiling point of the solvent. These interconversions may be illustrated by the following set of reactions:

$BiCo_3(CO)_{12} \xrightarrow{\Delta} BiCo_3(CO)_{11} \xrightarrow{\Delta} BiCo_3(CO)_{10} \xrightarrow{\Delta} BiCo_3(CO)_9$ Representative examples of trivalent Group V halides which are useful in the preparation of the metal cobalt carbonyl compounds of the present invention include $BiCl_3$, $BiBr_3$, $BiI_3$, $BiF_3$, $PCl_3$, $PBr_3$, $PI_3$, $PF_3$, $AsCl_3$, $AsBr_3$, $AsI_3$, $AsF_3$, $SbI_3$, $SbBr_3$, $SbCl_3$, $SbF_3$, $VCl_3$, $VF_3$, $VBr_3$ and the like.

As was described previously, novel compositions of matter having the general formula $MCo_3L_H(CO)_I$ may also be prepared wherein M is a Group V metal or metalloid, L is a ligand selected from the group consisting of Group V based biphyllic ligands having the general formula $R_1R_2R_3G$ where G is phosphorus, arsenic, antimony or bismuth and $R_1$, $R_2$, $R_3$ are monovalent hydrocarbyl radicals having from 1 to 20 carbon atoms; H of the formula is an integer ranging from 1 to 3 inclusive while I is an integer ranging from 6 to 11 inclusive; the further conditions being that the sum of $H+I$ is an integer ranging from 9 to 12 inclusive.

The ligands referred to above may be compounds of trivalent nitrogen such as primary, secondary of tertiary amines or various pyridines but are preferably ligands of the so-called π-acid or biphyllic type, based on other Group V elements; i.e, phosphorus, arsenic, antimony and bismuth. In these materials the Group V element is attached to three groups, preferably ones of a hydrocarbon nature. For example, alkyl, alkenyl, aryl, aralkyl, alkaryl, cycloalkyl, perfluoroalkyl, etc.; leaving on the Group V element a "free" electron pair which is capable of interacting with the transition metal atom. Representative examples of ligands amenable to the present invention are trialkyl phosphines such as trimethyl, triethyl, tri-n-butyl and tri-n-octyl phosphines; triaryl phosphines, for example, triphenyl phosphine; phosphines containing mixed aryl-alkyl groups, for example, alkyl diaryl phosphines, and aryl dialkyl phosphines. Other typical hydrocarbon radicals attached to the phosphorus atom may for example include the following: methyl, ethyl, isopropyl, methallyl, n-butyl, heptenyl, n-octyl, isooctyl, dodecyl, hexadecyl, cyclopentyl, cyclohexyl, cyclodecyl, phenyl, benzyl, phenylethyl, tolyl, xylyl, naphthyl, and styryl. These hydrocarbon radicals may be substituted with one or more groups such as hydroxyl, methoxyl, carbonyl, carboxyalkyl, acetyl, amino, dialkyl amino, halo (Cl, Br), nitro, cyano, sulphonyl and sulfoxyl.

It is also possible to use heterocyclic phosphines. In these compounds the phosphorus atom is connected to two carbon atoms which are members of a cyclic structure. A typical example is the following:

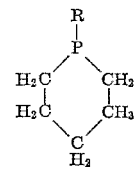

where R is any of the hydrocarbon or hydrocarbon-substituted groups described above. This carbon and phosphorus-containing cycle contains five carbon atoms and for this reason the carbon portion thereof may be referred to as a pentamethylene group. One or more of the hydrogen atoms of this group may be substituted by any of the mono-functional hydrocarbon or substituted hydrocarbon groups listed above. Also, the ring may contain unsaturation, i.e. olefinic double bonds. Furthermore, the phosphorus-carbon cycle may contain more than 5 carbon atoms; for instance, it may contain a hexamethylene group (6 carbon atoms) or an octamethylene group (8 carbon atoms) or a decamethylene group (10 carbon atoms).

Phosphines having bicyclic, heterocyclic structures are also suitable ligands. These compounds are most suitably described as ones containing one large carbocyclic structure of at least 6 carbon atoms (hexamethylene ring) and varying up to 10 carbon atoms (decamethylene ring) with a phosphorus atom linked to one mono-functional group (as described above) bridging in a transannular position within this large carbocyclic ring. The carbon atoms of the large carbocyclic ring may otherwise be linked only to hydrogen atoms or these hydrogen atoms may be part be substituted by the mono-functional groups listed above. The large carbocyclic ring may be completely saturated or may contain, depending upon its size, one or more olefinic double bonds. The bridging PR group generally can attach only to carbon atoms in the larger carbocyclic ring which are separated by at least two other carbon atoms, i.e., the smaller rings formed by the bridging phosphorus must contain a total of at least 5 atoms (carbon+phosphorus).

These possibilities are illustrated below for structures containing $C_7$ (heptamethylene), $C_8$ (hexamethylene), and $C_9$ (nonamethylene) carbocyclic rings (note: for simplicity, substituents on the carbon atoms are not shown).

(a) Heptamethylene carbocycle:

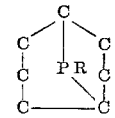

(b) Octamethylene carbocycle:

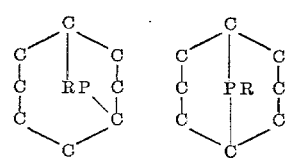

(c) Nonamethylene carbocycle:

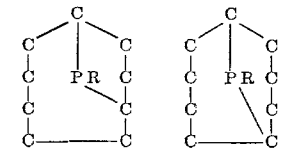

$R_1$, $R_2$ and $R_3$ are preferably monovalent acyclic or alicyclic alkyl radicals having from 1 to 20, preferably 3 to 12, carbon atoms; phenyl radicals, monovalent alkyl-aryl radicals having from 7 to 12, preferably from 7 to 10 carbon atoms and monovalent aralkyl radicals having from 7 to 12, preferably 7 to 10 carbon atoms.

It is noteworthy that some consideration must be given to the aggregate size of the combined groups $R_1$, $R_2$ and $R_3$. If this size becomes unduly large, then excessive amounts of the phosphine must be added to obtain the desired amount of phosphorus. The total number of carbon atoms in the phosphorus or arsenic-containing ligand should be between 6 and 50, preferably between 10 and 40. Suitable ligands falling within this preferred range of molecular size are listed below for purposes of illustration and without intent to limit the scope of the invention as outline above.

(1) Tri-n-butyl phosphine
$P(-CH_2-CH_2-CH_2-CH_3)_3$ (2) 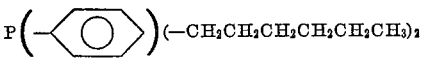
Phenyl di-n-hexyl phosphine (3) $P(n-C_8H_{17})_3$
Tri-n-octyl phosphine (4) $P(n-C_{18}H_{37})(n-C_4H_9)_2$
n-Octadecyl di-n-butyl phosphine (5) $P(n-C_{16}H_{33})(cyclo-C_6H_{11})_2$
n-Hexadecyl di-cyclohexyl phosphine (6) 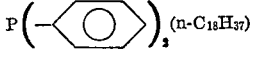
Diphenyl n-octadecyl phosphine (7) $P(n-C_{16}H_{33})_2(n-C_8H_{17})_3$
Di-n-hexadecyl n-octyl phosphine (8) $P(-CH_3)_2(n-C_8H_{17})$
Dimethyl n-octyl phosphine (9) 
Tri-ortho-tolyl phosphine

(10) 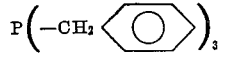
Tribenzyl phosphine

(11) 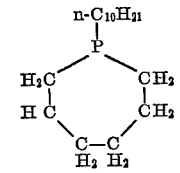
P-n-decyl phosphine

(12) 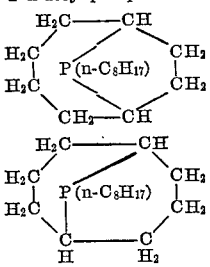
9-n-octyl 9-phospha-bicyclononanes [4.2.1] and [3.3.1]

(13) 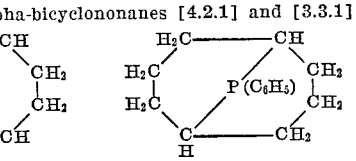
9-phenyl 9-phospha-bicyclononanes [4.2.1] and [3.3.1]

(14) 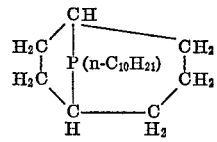
8-n-decyl 8-phospha-bicyclooctane [3.2.1]

Compounds having the general formula $MCo_3L_{1-3}(CO)_{8-11}$ have a wide range of structural types possible. The compositions amenable to the instant invention are illustrated below.

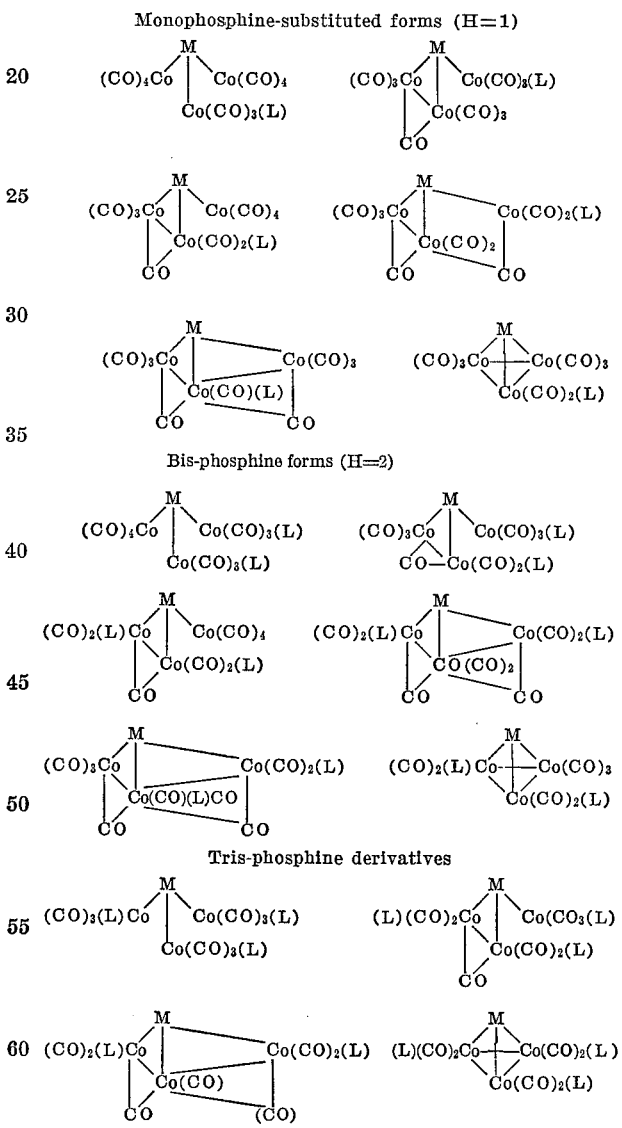

These compounds may be prepared by reacting compounds of the general composition $MCo_3(CO)_{9-12}$ prepared as described above with appropriate amounts of ligand L. A pure compound in the $MCo_3(CO)_{9-12}$ range or a mixture of compounds in this composition range essentially free of other materials may be used. Alternatively, mixtures of these compounds with inorganic salts, especially cobalt halides formed in the primary synthesis, i.e., $MX_3+Co_2(CO)_8$ reaction may be employed. Under certain conditions, however, the use of these cobalt halides can be deleterious leading to, especially at higher L/Co ratios above 3/1, to cleavage of the Co-M bonds and the formation of other materials distinctly different from the compounds herein claimed.

Generally, the reaction of the ligand L with $$MCo_3(CO)_{9-12}$$

will be carried out in a suitable solvent and under an oxygen-free atmosphere. Such a solvent may be a hydrocarbon or oxygenated or chlorinated hydrocarbon derivative. Nonlimiting representative examples of suitable solvents include:

(a) Ethers such as diethyl ether, di-n-butyl ether, tetrahydrofuran, glyme (dimethoxyethane), diglyme.

(b) Chlorinated hydrocarbons, e.g., methylene dichloride, chloroform, carbon tetrachloride, ethylene dichloride (1,2-dichloroethane), 1,1-dichloroethane, trichloroethylene, chlorobenzene, dichlorobenzene and the like.

(c) Aromatic hydrocarbons, for example, benzene, toluene and xylenes.

(d) N,N'-dialkyl acid amides, such as dimethyl formamide, diethylacetamide and the like.

In some cases it may be desirable to conduct the reaction under carbon monoxide, such that an oxygen free atmosphere is obtained; however, in some instances the presence of carbon monoxide, especially at elevated pressures, will effect the overall CO content and hence the structure of the product obtained.

Reaction temperatures may be varied from room temperature up to the temperature levels at which the product is to be used as a catalyst; i.e., the stability temperature of the product; preferably temperatures are in the range of from about 0° C. to about 180° C. In general, mole ratios of ligand/cobalt in the product are controlled by the ratio of the reactants, i.e., free ligand and $$MCo_3(CO)_{9-12}.$$

Generally speaking, the L/Co ratio in the reactants will be close to the desired L/Co ratio in the products. Preferably these ratios are in the range of 1/3 to 1/1.

These compounds in the pure state or mixed with each other may be used as carbonylation catalysts either as such or in mixtures with inorganic compounds. As catalysts they may be prepared in situ in the carbonylation reaction by mixing ligand L and the $MCo_3(CO)_{9-12}$ compounds in the actual reaction mixture prior to or during the carbonylation reaction being catalyzed. Although a compound of a given L/Co ratio is prepared for use as a catalyst, it does not necessarily follow that the catalyst species functioning in a carbonylation reaction has the same L/Co ratio as that prepared. This is due to the reversible nature of the ligand substitution reaction illustrated by the following equation:

$$CO + MCo_3(CO)_9(L)_3 \rightleftharpoons L + MCo_3(CO)_{10}(L)_2$$

Hence, especially under high CO pressures, when it is important to maintain the catalyst species in the desired form it is necessary to employ in the various carbonylation reactions an excess of ligand L.

DESCRIPTION OF THE PREFERRED EMBODIMENT

The reaction sequence employed preferably in the preparation of the compositions of matter represented by the general formula $MCo_3(CO)_y$ is the reaction of the Group V metal or metalloid halides with dicobalt octacarbonyl, $Co_2(CO)_8$. The contacting is carried out in the presence of a suitable solvent and under a nonoxidizing atmosphere, preferably 1-40 atm. carbon monoxide. The preparations of compositions of matter having the general formula $MCo_3L_H(CO)_I$ is carried out by reacting ligand L with the reaction mixture from an $MX_3$-$Co_2(CO)_8$ reaction, prior to the removal of the solvent or cobalt halide products. The compounds $MCo_3L_H(CO)_I$ can then be recovered directly from the resulting reaction mixture by removing solvent and the cobalt halides.

The compositions prepared by the present invention are useful as catalyst materials in a wide variety of reactions. Included in these reactions are ones involving carbon monoxide reaction with organic moieties such as olefins, diolefins, polyolefins, aromatics, alcohols, amines, alkyl and aryl halides, olefin oxides, nitriles, etc. The present invention may be further illustrated but is not necessarily limited to the following examples.

Example 1.—Preparations of $PCo_3(CO)_9$ and $PCo_3(PBu_3)_2(CO)_7$

A 1-liter, 4-necked flask equipped with a dropping funnel and a gas collecting system was charged under carbon monoxide with 15.72 g. (45 mmole) of freshly recrystallized dicobalt octacarbonyl in 200 ml. of benzene. The dropping funnel was charged with 8.24 g. (20 mmole) phosphorous triiodide solution in benzene. The apparatus was flushed with carbon monoxide for 10–15 minutes. The $PI_3$ solution was added in 10 ml. aliquots over a 9½ hour period. During this time a total of 4280 ml. carbon monoxide evolved at 765–770 mm. Hg and 27–28° C. This is approximately 8.9 mols. CO/mol. $PI_3$, in close agreement with the theoretical equation:

$$PI_3 + 2¼ Co_2(CO)_8 \rightarrow PCo_3(CO)_9 + 9CO + 1½ CoI_2$$

An infrared spectrum of the reaction solution in benzene showed absorption at 2107 (w.), 2092 (sh.), 2063 (v.s.), 2043 (s.), 1998 (m.). A TLC (100% $CH_2Cl_2$) revealed only one component (green) other than the residual $CO^{++}$ salts at $R_f = 0$.

A small portion of the reaction mixture (about 6%) was withdrawn for special testing. The remaining bulk of the reaction mixture was stirred under a carbon monoxide atmosphere overnight. The compound $PCo_3(CO)_9$ is quite stable in the reaction mixture under carbon monoxide, but is difficult to isolate in pure form, since it undergoes polymerization (self-ligandization) reactions with CO evolution when the CO atmosphere is removed. The phosphinated derivatives are much more stable and can be readily prepared from the original reaction mixture and isolated in a stable state (see below).

Tributylphosphine (7.9 g., 38.7 mmoles) dissolved in 200 ml. of THF was added to the bulk of the reaction mixture slowly. After all the tributylphosphine was added, the solution was heated to 60° C. for an hour and then cooled to room temperature. The reaction mixture was then filtered and transferred to a 1 liter addition funnel where it was stored under CO for future use.

Two-hundred and fifty milliliters of the reaction mixture were removed and washed with 500 ml. of deoxygenated water in 3 equal aliquots to remove the cobalt halide. The layers were separated and the organic layer dried with $MgSO_4$. The solvent was removed at reduced pressure to give 7.2 g. of tarry residue.

Three samples of this tarry product were weighed out and stored at 0°. They were decomposed after the initial weighing, 7 and 14 days later with an $I_2/CH_3CO_2H$ solution. The gas (CO) generated from the sample tested first was 186 cc. (STP)/g. sample. The sample stored for one week contained 188 cc./g. sample. The sample held for two weeks had 194 cc./g. sample. These data demonstrated the compound did not undergo CO loss during storage. The theoretical gas generated from $PCo_3(CO)_7(PBu_3)_2$ is 188 cc./g. sample. IR of the bis-phosphine complex (THF: ~CO: 2070 (w.), 2040 (s.), 2020 (v.s.), 2000 (sh.), 1987 (s.), 1950 (w.), 1909 (s.), 1890 (m.).

Example 2(a).—Preparation of $AsCo_3(CO)_9$

A 1-liter, 4-necked flask equipped with magnetic stirrer, dropping funnel and a gas collecting system was charged under an atmosphere of carbon monoxide with 3.147 g. (10 mmoles) of arsenic tribromide in 100 ml. purified tetrahydrofuran. The dropping funnel was charged, also under carbon monoxide with 7.86 g. (22.95 millimoles) of freshly recrystallized cobalt octacarbonyl dissolved in 100 ml. purified tetrahydrofuran. With stirring the contents of the funnel were added to the flask over a 12-hour period. Temperature of the reaction mixture was maintained at 23–4° C. throughout. Total CO evolution observed amounted to 9.1 moles per g. atom of arsenic used, corresponding closely to the reaction:

The tetrahydrofuran solvent was removed by evaporation at room temperature into a stream of carbon monoxide. The resulting solid was extracted with methylene chloride. A dark green compound was crystallized from this solvent and showed the following properties:

Infrared spectrum (in cyclohexane): $\gamma CO$: 2072 cm.$^{-1}$ (very strong), 2062 (strong), 2042 (intermediate), 2022 (weak).

Analysis.—Calcd. for $AsCo_3(CO)_9$ (percent): As, 14.9; Co, 35.2; C, 21.45; H, 0.00. Found (percent): As, 14.8; Co, 35.7; C, 19.90; H, 0.01.

CO Evolution Test: On treatment of 0.137 g. with $I_2$-acetic acid solution in a gas-measuring apparatus, 55.8 cc. of carbon monoxide (measured at standard conditions of temperature and pressure) were evolved. This compares closely with the theoretical value of 54.8 cc. for the structure $AsCo_3(CO)_9$.

Example 2(b).—Preparation of $AsCo_3(n-Bu_3P)_3(CO)_6$

To a bomb was charged 5.0 g. of the compound $AsCo_3(CO)_9$ prepared as above, 8.0 g. tri-N-butyl phosphine and 100 ml. benzene. After pressuring with carbon monoxide to 1000 lbs., the reaction mixture was heated at 180° C. for 3 hours. By chromatographing the resulting reaction mixture on silica gel, the main product was isolated as a deep red oil having the following characteristics:

Infrared (in cyclohexane): $\gamma CO$: 2022 cm.$^{-1}$ (strong); 1972 (very strong).

Analysis.—Calcd. for $AsCo_3(CO)_6(n-Bu_3P)_3$ (percent): As, 7.3; Co, 17.3; P, 9.1; C, 49.0; H, 7.9. Found (percent): As, 7.5; Co, 13.9; P, 7.77; C, 51.1; H, 7.81.

CO Evolution Test: When treated with $I_2$-acetic acid, 0.1006 g. evolved 13.7 cc. CO at STP vs. 13.7 cc. theory for the structure represented by the formula:

$$AsCo_3(n-Bu_3P)_3(CO)_6$$

Example 2(c).—Preparation of composition containing 1/1 $n-Bu_3P/As$

Arsenic tribromide and cobalt octacarbonyl were reacted as described in Example 2(a). After evolution of carbon monoxide ceased, but CO atmosphere still present, freshly distilled tri-N-butyl dissolved in purified tetrahydrofuran and in an amount correponding to one mole per mole of arsenic tribromide originally taken was added to the reaction mixture over a three-hour period at room temperature (27–29° C.). The reaction mixture was then heated for about 8 hours at 50–62.5° C. A portion of the liquid was withdrawn and washed three times with deoxygenated water under carbon monoxide. After final separation of the aqueous phase, the organic layer was evaporated to dryness with a stream of carbon monoxide. The recovered product was a semisolid, black in color and somewhat tacky in nature. On treatment with $I_2$-acetic acid solution, the carbon monoxide evolution was 92.5% of theory for the structure $AsCo_3(n-Bu_3P)(CO)_8$. This somewhat low value is attributed to partial polymerization (self-ligandization) of the material during recovery, according to the reaction:

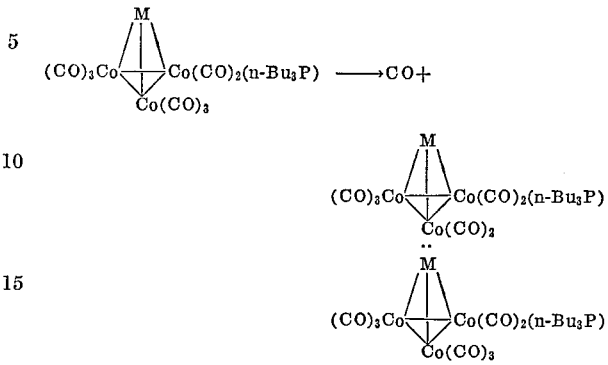

Upon storage of the solid at room temperature under both $N_2$ and CO, a continued loss of CO over a two-week period was observed, showing further but slow progress of the self-ligandization process.

The product showed, in thin layer chromatography, the presence of at least two compounds. This conforms to the different possible structures of the same composition as pointed out above.

Example 2(d–1).—Preparation of composition containing 2/1 $n-Bu_3P/As$

In a 1-liter, 4-necked flask filled with carbon monoxide was placed 0.707 g. (1.04 millimoles) of the composition described in Example 2(c) having the formula $$AsCo_3(n-Bu_3P)(CO)_8$$

and dissolved in 100 ml. of purified tetrahydrofuran. To this was quickly added 0.211 g. (1.04 millimoles) of tri-n-butyl phosphine dissolved in 35 ml. tetrahydrofuran. The reaction mixture was stirred at room temperature for approximately 1½ hours and then heated to 60° C. for ¼ hour.

The solvent was removed by evaporation, and a black solid recovered. Upon treatment with $I_2$-acetic acid, this solid evolved carbon monoxide equal to 179.6 cc. STP g. solid. This is to be compared with the theoretical value of 183.8 cc. (STP)/g. for the formula $$AsCo_3(n-Bu_3P)_2(CO)_7$$

Example 2(d–2).—Preparation of composition containing 2/1 $n-Bu_3P/As$

Using the procedure described in Example 2(a), arsenic tribromide (6.294 g.) was reacted with recrystallized cobalt octacarbonyl (15.72 g.). Carbon monoxide equivalent to 8.8 mols/mole $AsBr_3$ were evolved. To the reaction mixture still under carbon monoxide was then added, over a period of 12 hours at room temperature, 8.10 g. of tri-n-butyl phosphine dissolved in 250 cc. purified tetrahydrofuran. The reaction mixture was heated for three hours at 40–55° C. The product was then freed of cobalt halides by the water washing procedure described in Example 2(c) and the solvent removed by stripping under vacuum at room temperature.

The product recovered showed in the $I_2$-acetic acid test, somewhat higher CO-ligand content that the material prepared in Example 2(d–1) from $n-Bu_3P$ and the pre-recovered monophosphinated compound. The evolved CO in the present case amounted to 204.2 cc. (STP)/g., which is close to the value of 203.5 cc. (STP)/g. expected for $AsCo_3(n-Bu_3P)_2(CO)_8$. These formulas are all to be expected from the structural variations described above. The somewhat higher CO-ligand content of the present product as compared to that in Example 2(d–1), is due to the fact that in the present case the CO loss inherent in recovering the monophosphinated derivative was avoided. The bisphosphinated derivatives are much more stable toward CO loss than the mono-phosphinated ones.

It is possible by this technique to obtain products of even higher CO-ligand content. For instance, in other preparations using this general procedure, products showing CO values as high as 208.5 cc. (STP) and 225.2 cc. (STP)/g. were obtained. These values are to be compared with the following theoretical values:

| Formula: | Theoret. cc. (STP)/g. |
|---|---|
| $AsCo_3(n-Bu_3P)_2(CO)_8$ | 203.5 |
| $AsCo_3(n-Bu_3P)_2(CO)_9$ | 212.2 |
| $AsCo_3(n-Bu_3P)_2(CO)_{10}$ | 239.2 |

These formulas are all consistent with the structures shown above for these phosphinated derivatives. Also, these results show that depending upon the care taken to exclude loss of CO during product synthesis and recovery, a range of CO-ligand contents can be obtained in actual practice.

Example 3(a).—Preparation of composition containing 1/1 n-Bu₃P/Sb

Using the procedure described in Example 2(a) antimony-tribromide (7.24 g.) was reacted with recrystallized cobalt octacarbonyl (15.72 g.). The reaction mixture was held at room temperature throughout. Carbon monoxide evolved was 8.3 mole/mole SbBr₃, showing that a mixture of compounds, having the formula $SbCo_3(CO)_{10}$ was formed. This was confirmed by the infrared spectrum of the final reaction mixture.

The entire reaction mixture was then treated with 4.043 g. tri-n-butyl phosphine (n-Bu₃P) according to the procedure used in Example 2(c) for the preparation of the corresponding arsenic-containing composition. The cobalt bromide was then removed by water washing and the solvent removed by vacuum stripping. The resulting semi-solid product was black in color. When treated with I₂-acetic acid, carbon monoxide evolved amounted to 232.0 cc. (STP)/g. solid, as compared to a value of 247.0 cc. (STP)/g. expected for the formula $$SbCo_3(n-Bu_3P)(CO)_8$$

This composition appears to be more stable toward CO loss than the corresponding arsenic-containing one, showing no decrease in CO content when stored for extended periods at 0° C. When stored at room temperature for extended periods, however, some loss of CO ligands does occur.

Example 3(b–1).—Preparation of composition containing 2/1 n-Bu₃P/Sb

A reaction mixture produced by the cobalt octacarbonyl-antimony tribromide reaction was treated with one mole n-Bu₃P/mol SbBr₃ originally taken (see Example 3(a)). Then an additional mole of n-Bu₃P, making a total of 2 mols n-Bu₃P/mol SbBr₃, was added, and the reaction mixture heated at 54° C. for 5½ hours. The resulting product was worked up by water washing and vacuum stripping of the solvent as described above. The black solid recovered showed, on treatment with I₂-acetic acid, CO evolution amounting to 200 cc. (STP)/g. This corresponds to a mixture of compositions having the formulas: $SbCO_3(n-Bu_3P)_2(CO)_9$ (theory=210.9 cc./g.) and $SbCo_3(n-Bu_3P)_2(CO)_8$ (theory=193.6 cc./g.).

*Analysis.*—For P: Calcd. from CO analysis, 6.59%; found, 6.67%.

Example 3(b–2).—Preparation of composition containing 2/1 n-Bu₃P/Sb

Compositions containing 1/1 n-Bu₃P/Sb which have undergone some depletion of CO during storage can be converted to compositions containing 2/1 n-Bu₃P/Sb by treatment with additional n-Bu₃P and carbon monoxide at elevated temperatures and pressure. For instance, a partially CO-depleted composition prepared as in Example 3(a) and characterized by a CO evolution value of 195 cc./g. [corresponding to compositions having the formula $SbCo_3(n-Bu_3P)(CO)_6$] and showing a P analysis of 4.67% (theory=4.85%) was heated with one mole of n-Bu₃P in cyclohexane under 1000 lbs. of 2/1 H₂-CO gas for 61 hrs. After cooling, depressuring and removing solvent, a brown solid was recovered. Analysis of this material showed the composition to have a structure represented by the formula:

$$SbCo_3(n-Bu_3P)_2(CO)_7$$

Example 4(a).—Preparation of $BiCo_3(CO)_{12}$

A 1000 ml., 4-necked flask equipped in the usual manner was charged under carbon monoxide with 11.80 g. (20.0 mmoles) of bismuth triiodide in 200 ml. of THF. The addition funnel was charged with 15.72 g. (45 mmoles) of dicobalt octacarbonyl in 200 ml. of THF. The system was flushed with CO and allowed to stabilize. The dicobalt octacarbonyl solution was added in 5 ml. aliquots in 15 hours. During this time a total of 2815 cc. of CO at about 765 mm. Hg and 26° C. evolved, corresponding to 5.9 mols CO/mol BiI₃ showing that the following reaction took place:

$$BiI_3 + 2\tfrac{1}{4} Co_2(CO)_8 \rightarrow BiCo_3(CO)_{12} + 6CO + 1\tfrac{1}{2} CoI_3$$

TLC (2/1, acetone/CH₂Cl₂) revealed one red component $$R_f \fallingdotseq 0$$

Half the reaction mixture was added to 200 ml. of ether and 200 ml. of deoxygenated water under CO. After agitation the layers were separated and the organic layer dried over MgSO₄. TLC of this layer showed only one red-purple component. The ether was removed at reduced pressure to give 8.7 g. of purple paste. This paste was extracted with methylene chloride. An oil developed when the extract was cooled in a Dry-Ice/IPA slurry. The solvent was decanted at reduced pressure and the residue dried at <1 mm. Hg to give 5.5 g. black solid (M.P. 90–91° C.). Solutions of this compound were dark red-brown. Attempted sublimation failed. A similar procedure was followed with the second half of the reaction mixture. The product was identified as $BiCo_3(CO)_{12}$, CO-ligand content by I₂-acetic acid method being 365 cc. (STP)/g. vs. theoretical 372 cc./g.

The IR spectrum of the product in methylene chloride is 2067 (v.s.), 2050 (w.), 2008 (s.), 2000 (s., sh.), 1248 (s.), 893 (s.). An analysis of this product showed the presence of 22.52% carbon, 1.23% hydrogen. The calculated amounts are 20.0% carbon, 0.0% hydrogen. Bismuth was identified by X-ray fluorescence. A mass spectrum at $I_v$=150 ev. showed the presence of ions at m./e. corresponding to $BiCo_3(CO)_9$, $BiCo_2$, and BiCo besides the presence of THF.

Example 4(b).—Preparation of $BiCo_3(n-Bu_3P)_3(CO)_9$

A 250 ml. Erlenmeyer flask was charged with 0.5 g. (0.7 mmole) of Bi[Co(CO)₄]₃ and 50 ml. of cyclohexane under CO. The flask was attached to a 100 ml. burette charged with a 0.1 molar solution of n-Bu₃P(tri-n-butylphosphine) in cyclohexane. A total of 42 ml. (4.2 mmoles) of n-Bu₃P solution was added slowly. The solution was heated to 40° C. and cooled.

The solution was transferred to a round bottomed flask and the solvent removed at reduced pressure. The residue was extracted, with methylene chloride and filtered. This solvent was removed at high vacuum to give 0.3 g. of a black solid (M.P. 151–3° dec.) which analyzed correctly for $BiCo_3(n-Bu_3P)_3(CO)_9$.

IR (cyclohexane): γCO, 1988 (s.), 1954 (v.s.), 1934 (v.s.).

*Analysis.*—Calcd. for $BiCo_3(n-Bu_3P)_3(CO)_9$ (percent): C, 43.4; H, 6.56; P, 7.47; Co, 14.2. Found (percent): C, 44.12; H, 6.60; P, 7.58; Co, 14.03.

USE OF GROUP V-COBALT COMPOUNDS AS CATALYSTS

Example A.—Use of $PCo_3(n-Bu_3P)_2(CO)_7$ as a catalyst in hydroformylation To a 300 ml. aminco bomb equipped with a glass liner the following were charged:

20 ml. hexene-1
15 ml. cyclohexane
0.48 g. of a composition having the formula $PCo_3(n-Bu_3P)_2(CO)_7$ containing 2 mols $n-Bu_3P$ per $[PCo_3]$ units and prepared from reaction of 2 mols of $n-Bu_3P$ with a reaction mixture prepared by the interaction of 1 mol $PI_3$ with 2¼ mols cobalt octacarbonyl as described above (Example 1).

After pressuring the bomb with $H_2$-CO (2/1 mole ratio) gas, heating and gentle agitation of the bomb was initiated. Reaction as evidenced by gas absorption began when the temperature of the bomb attained 160° C. Reaction was continued at this temperature level. Pressure decrease in the bomb during the initial hour was 105 p.s.i., increasing to 250 p.s.i. in 3¼ hours. The bomb was cooled, depressured, and the liquid analyzed by gas chromatographic procedures. It was found that 77% of the hexene underwent conversion to $C_7$ aldehydes and alcohols, approximately 56% of the total having a linear $C_7$ structure.

Example B–1.—Use of $PCo_3(CO)_7(n-Bu_3P)_2$ with in-situ formation of catalyst in hydroformylation reaction mixture As in Example A, the following reaction mixture was charged to the 300 ml. bomb:

20 ml. hexene-1
15 ml. cyclohexane
0.12 g. $n-Bu_3P$
0.38 g. of a composition made as shown in above examples by reacting 1 mole $n-Bu_3P$ with the reaction product of 1 mole $PI_3$ with 2¼ mols $Co_2(CO)_8$ (Composition: $PCo_3(n-Bu_3P)(CO)_8$). The free phosphine (0.12 g.) added here corresponds to 1 mole per mole of $PCo_3(n-Bu_3P)(CO)_8$ Reaction was carried out overnight at 160° C. with 1000 p.s.i. of 2/1 $H_2$-CO gas. Initial pressure decrease was 40 p.s.i./hr. Conversion of hexene-1 to $C_7$ aldehydes-alcohols was approximately 70%. These oxygenated products show a linear $C_7$ isomer content of 87%.

Example B–2.—Use of $PCo_3(n-Bu_3P)_3(CO)_6$ as catalyst with partial addition of phosphine to hydroformylation reaction mixture As in Example A, a reaction mixture consisting of the following was charged to the 300 ml. bomb:

20 ml. hexene-1
15 ml. cyclohexane
0.48 g. $PCo_3(CO)_7(n-Bu_3P)_2$ (see Example A)
0.12 g. $n-Bu_3P$ The free phosphine (0.12 g.) added corresponds to 1 mole per mole of $PCo_3(CO)_7(n-Bu_3P)_2$.

As in Example A, reaction started at 160° C. with 1000 p.s.i. 2/1 $H_2$-CO present. Initial rate of pressure decrease was 30 p.s.i./hr. Reaction proceeded overnight at 160° C. Analysis of the liquid product showed that 67% of hexene-1 was converted to heptaldehydes and heptanols, the mixed products being 80% linear $C_7$ isomers.

Example C.—Use of $PCo_3(n-Bu_3P)_3(CO)_6+1 n-Bu_3P$ as catalyst in hydroformylation As in Example A, bomb was charged with:

20 ml. hexene-1
15 ml. cyclohexane
0.24 g. $n-Bu_3P$
0.48 g. of $PCo_3(n-Bu_3P)_2(CO)_7$ (see Example A)

The overall catalyst in this example contains $n-Bu_3P$ and $[PCo_3]$ unit in a 4/1 mol ratio and hence is $$PCo_3(n-Bu_3P)_3(CO)_6 + 1 \text{ mole } n-Bu_3P \text{ (excess)}$$

With 2/1 $H_2$-CO gas at 1000 p.s.i., reaction was initiated at 180° C., a pressure drop of 145 p.s.i. being noted in the 3-hour reaction period. Product analysis showed 60% conversion of the hexene-1 to alcohols and aldehydes in a 68/32 ratio. Overall content of linear $C_7$ isomers in the combined alcohol-aldehyde mixture was 89%.

Example D.—$[AsCo_3(CO)_9]$ as catalyst in hydroformylation

The 300 ml., glass-lined bomb was charged with:

30 ml. hexene-1
20 ml. benzene
0.35 g. of the compound $AsCo_3(CO)_9$ synthesized as described above.

With 1500 p.s.i. of 1/1 $H_2$-CO gas, reaction was initiated by heating to 120° C. A pressure drop of 655 p.s.i. was observed during the 4½ hour reaction period. Conversion of hexene-1 to $C_7$ alcohols-aldehydes (3/97 ratio) was almost 100%. The alcohol fraction contained 62% n-heptanol and the aldehyde fraction 73% n-heptanal.

Example E.—$AsCo_3(n-Bu_3P)(CO)_8$ as catalyst in hydroformylation

As in Example A, the pressure bomb was charged with:

20 ml. hexene-1
15 ml. cyclohexane
0.30 of the compound $AsCO_3(CO)_9$
0.12 g. $n-Bu_3P$ This charge contains $n-Bu_3P$ and $AsCo_3(CO)_9$ in a 1/1 mole ratio.

With 1000 p.s.i. of 1/1 $H_2$-CO gas, reaction started when the bomb was heated to 180° C. Pressure drop of 185 p.s.i. was observed during the 3¾ hour reaction period. Conversion of hexene-1 to alcohols and aldehydes was 73%. Overall content of linear $C_7$ isomers was 75%.

What is claimed is:

1. Compositions of matter having the general formula:

$$MCo_3L_H(CO)_I$$

wherein M is a Group V metal or metalloid, L is a ligand selected from the group consisting of Group V based biphyllic ligands having the formula:

$$R_1R_2R_3G$$

wherein G is phosphorous, arsenic, antimony or bismuth and $R_1$, $R_2$, and $R_3$ are monovalent hydrocarbyl radicals having from 1 to 20 carbon atoms, H is an integer ranging from 1 to 3 inclusive, I is an integer ranging from 6 to 11 inclusive, and the sum of $H+I$ is an integer ranging from 9 to 12 inclusive.

2. The compositions of matter of claim 1 wherein $R_1$, $R_2$ and $R_3$ are to be further selected from the group consisting of alkyl radicals having from 1 to 20 carbon atoms, phenyl radicals, alkaryl radicals having from 7 to 12 carbon atoms and aralkyl radicals having from 7 to 12 carbon atoms.

3. The compositions of matter of claim 1 wherein H is 1.

4. The compositions of matter of claim 1 wherein H is 2.

5. The compositions of matter of claim 1 wherein G is phosphorous.

6. The compositions of matter having the general formula:

$$MCo_3L_H(CO)_I$$

wherein M is a Group V metal or metalloid, and L is a ligand selected from the group consisting of heterocyclic phosphine moieties having from 5 to 10 carbon atoms contained in a cyclic structure and bicyclic phosphine materials having carbocyclic ring structures of from 6 to 10 carbon atoms containing a bridged phosphorous atom.

7. The compositions of matter of claim 6 wherein said carbocyclic ring structures are selected from the group consisting of heptamethylene, octamethylene and nonamethylene carbocyclic rings.

8. A method of preparing ligand substituted metal cobalt carbonyl compounds having the general formula:

$$MCo_3L_H(CO)_I$$

which comprises contacting compound(s) A of the formula $MCo_3(CO)_{9-12}$ with a ligand L, wherein the ligand is selected from the group consisting of Group V base biphyllic ligands having the formula $R_1R_2R_3G$ wherein G is phosphorous, arsenic, antimony or bismuth and $R_1$, $R_2$ and $R_3$ are monovalent hydrocarbyl radicals having from 1 to 20 carbon atoms, H is an integer ranging from 1 to 3 inclusive, I is an integer ranging from 6 to 11 inclusive, the sum of $H+I$ is an integer ranging from 9 to 12 inclusive, and M is a Group V metal or metalloid, said contacting being conducted in a solvent and under a non-oxidizing atmosphere and thereafter recovering a yield of product comprising said ligand substituted metal cobalt carbonyl compounds.

9. The method of claim 8 wherein $R_1$, $R_2$ and $R_3$ are to be further selected from the group consisting of alkyl radicals having 1 to 20 carbon atoms, phenyl radicals, alkaryl radicals having from 7 to 12 carbon atoms, and aralkyl radicals having from 7 to 12 carbon atoms.

10. The method of claim 8 wherein the compound A has the formula $MCo_3(CO)_9$.

References Cited

UNITED STATES PATENTS

| | | | |
|---|---|---|---|
| 3,647,842 | 3/1972 | Wilkes | 260—439 R |
| 3,676,474 | 7/1972 | Tsai et al. | 260—439 R |
| 3,679,722 | 7/1972 | Tsai et al. | 260—439 R |
| 3,692,864 | 9/1972 | White et al. | 260—439 R |
| 3,695,853 | 10/1972 | Klanberg et al. | 260—439 R |

WERTEN F. W. BELLAMY, Primary Examiner

U.S. Cl. X.R.

23—203 C; 260—604 HF, 632 HF